Patented Nov. 7, 1950

2,528,544

UNITED STATES PATENT OFFICE 2,528,544

INSECT REPELLENT PREPARATIONS

Michel Pijoan, Boulder, Colo.

No Drawing. Application December 5, 1946,
Serial No. 714,229

4 Claims. (Cl. 167—42)

(Granted under the act of March 3, 1883, as
amended April 30, 1928; 370 O. G. 757)

This invention relates to improved insect repellent preparations, more particularly to a repellent composition in emulsion form.

The present invention is a continuation in part of prior application, Serial No. 612,117, filed August 22, 1945, now Patent No. 2,512,675, dated June 27, 1950, and Serial No. 620,384, filed October 4, 1945.

As described in prior application, Serial No. 612,117, it has been found that certain hydrogenated naphthols proved to be satisfactory repellents for insects and also that when certain specific naphthols were mixed in definite proportions a marked synergism resulted.

Similarly, as described in prior application, Serial No. 620,384, it was found that certain hydrogenated diphenyl compounds presented marked insect repellent activity and that mixtures of diphenyl compounds presented a greatly increased repellent activity. Many of these insect repellents are highly effective and only a small quantity need be applied. The application of a small quantity of a viscous liquid can best be in a liquid diluent or in the form of an aqueous emulsion.

It was also pointed out in the co-pending application that the addition of a carrier vehicle or diluent may profoundly affect the activity of the repellent. In some cases this action is synergistic and in others it is antagonistic. There appears to be no a priori considerations upon which a suitable carrier vehicle or diluent may be chosen. For example, as was pointed out in the prior application, common vehicles such as ethyl alcohol, displayed a synergistic or antagonistic effect even after the apparent evaporation of the alcohol from the surface of the skin.

In many circumstances an emulsion is an eminently desirable vehicle for the application of insect repellents to the surfaces to be protected. This is particularly true in the cosmetic field. Aqueous emulsions also have the advantage of being relatively non-inflammable and odorless.

It has been found as a result of considerable experimentation that stable emulsions of these insect repellents may be produced without antagonistic effects upon the repellents. As a result of tests under simulated tropical conditions it has been ascertained that emulsion-repellent preparations containing only 50% of repellent chemicals were almost as effective as the pure repellent chemicals. Thus, it is apparent that with the proper choice of emulsifying agents the effectiveness of the repellent chemicals may be synergistically enhanced.

The following formulas are typical preparations which have been found to be effective as insect repellents:

Formula I

| | Cc. |
|---|---|
| 2 phenyl cyclohexanol | 35 |
| 2 cyclohexyl cyclohexanol | 15 |
| Gum tragacanth 1% in aqueous solution | 50 |

In producing this emulsion the mixed repellent chemicals are added slowly to the aqueous solution with constant stirring as, for example in a Waring Blender or other emulsifying apparatus. The product is an oil in water emulsion which may be readily applied to the skin and is highly effective as an insect repellent.

Formula II

| 2 phenyl cyclohexanol | cc | 35 |
|---|---|---|
| 2 cyclohexyl cyclohexanol | cc | 15 |
| Acacia | gm | 12 |
| Water | cc | 50 |

The gum acacia is ground into the mixed repellents and to this the water is slowly added with vigorous agitation. This procedure produced a stable water in oil emulsion which is also highly effective as an insect repellent.

Formula III

| | Cc. |
|---|---|
| 2 phenyl cyclohexanol | 35 |
| 2 cyclohexyl cyclohexanol | 15 |
| Triethanolamine | 5 |
| Gum tragacanth in 1% aqueous solution | 45 |

A well stirred mixture of the aqueous solution of the tragacanth and the triethanolamine is poured slowly and with vigorous agitation into the repellent mixture. This produces a stable emulsion containing effective insect repellents.

Formula IV

| | Cc. |
|---|---|
| 2 phenyl cyclohexanol | 35 |
| 2 cyclohexyl cyclohexanol | 15 |
| Dimethoxy cellulose (15 C. P. S.) in .5% aqueous solution | 50 |

The mixed repellents are added slowly and with vigorous agitation to the solution of dimethoxy cellulose producing a stable effective emulsion. The above formula may be modified so as to impart in addition, effective sun screen properties by adding a suitable screening agent such as sodium salicylate in an amount of from about 2 to 5 percent of the aqueous phase.

Compositions of similar effectiveness may be produced according to the formula given above utilizing the optimum mixtures of the hydrogenated naphthols as set forth in application, Serial No. 612,117 and hydrogenated diphenyls as described in application, Serial No. 620,384.

Similarly, insect repellent emulsions may be made up by the same technique utilizing equivalent amounts, i. e., of the order of 50% more or less of other repellent chemicals, for example effective insect repellent emulsions may be produced by utilizing 1,2 dihydronaphthalene or 2 methoxy cyclohexanol in lieu of the repellent compositions in Formulas I to IV. Again, effective repellent compositions may be produced by emulsifying a mixture of approximately 3 parts of 2 phenyl cyclohexanol, 6 parts of 2 cyclohexyl cyclohexanol and 1 part of hydrogenated vanillin in 10 parts of water.

The protection afforded from these repellents is from 4 to 6 hours under simulated tropical conditions of 90° F. dry bulb and 80° F. wet bulb. In actual tests in the tropics the composition displayed a repellency of from 10 to 13 hours against *Aedes albimanus*. The effectiveness of the emulsions closely parallels that of the repellent mixtures described in the earlier applications. Repellent emulsions of the type described are effective against mosquitoes, mites, chiggers, ants and certain fleas.

As will be appreciated, emulsions may be made up for other than topical application, for example emulsions suitable for spraying may be produced according to the several methods described but employing greater percentages of water. If desired, wetting agents having no antagonistic effect on the repellent, such as aerosol, may be incorporated in the emulsion to improve its effectiveness.

The invention described herein may be manufactured and used by or for the Government of the United States of America for governmental purposes without the payment of any royalties thereon or therefor.

I claim:

1. An insect repellent composition comprising a mixture of 35 parts of 2 phenyl cyclohexanol and 15 parts of 2 cyclohexyl cyclohexanol emulsified in 50 parts of water containing an emulsifying agent.

2. An insect repellent composition comprising a mixture of 35 parts of 2 phenyl cyclohexanol and 15 parts of 2 cyclohexyl cyclohexanol emulsified in 50 parts of an aqueous vehicle containing gum acacia.

3. An insect repellent composition comprising a mixture of 35 parts of 2 phenyl cyclohexanol and 15 parts of 2 cyclohexyl cyclohexanol emulsified in 50 parts of aqueous gum tragacanth solution.

4. An insect repellent composition comprising a mixture of 35 parts of 2 phenyl cyclohexanol and 15 parts of 2 cyclohexyl cyclohexanol emulsified in 50 parts of an aqueous solution of dimethoxy cellulose.

MICHEL PIJOAN.

REFERENCES CITED

The following references are of record in the file of this patent:

UNITED STATES PATENTS

| Number | Name | Date |
|---|---|---|
| 1,755,178 | Grant | Apr. 22, 1930 |
| 1,842,993 | Marx | Jan. 26, 1932 |
| 1,942,801 | Britton | Jan. 9, 1934 |
| 1,963,955 | Cleveland | June 26, 1934 |
| 2,005,797 | Moore | June 25, 1935 |
| 2,073,683 | Christiansen | Mar. 16, 1937 |
| 2,100,468 | Brubaker et al. | Nov. 30, 1937 |
| 2,118,954 | Thomas | May 31, 1938 |
| 2,125,310 | Perkins | Aug. 2, 1938 |
| 2,136,020 | Pirie | Nov. 8, 1938 |
| 2,396,013 | Jones | Mar. 5, 1946 |

FOREIGN PATENTS

| Number | Country | Date |
|---|---|---|
| 28,059 | France | Jan. 14, 1925 |
| | (Addition to No. 566,406) | |
| 505,426 | Germany | Sept. 4, 1930 |
| 694,421 | Germany | Aug. 1, 1940 |